Figure 1:
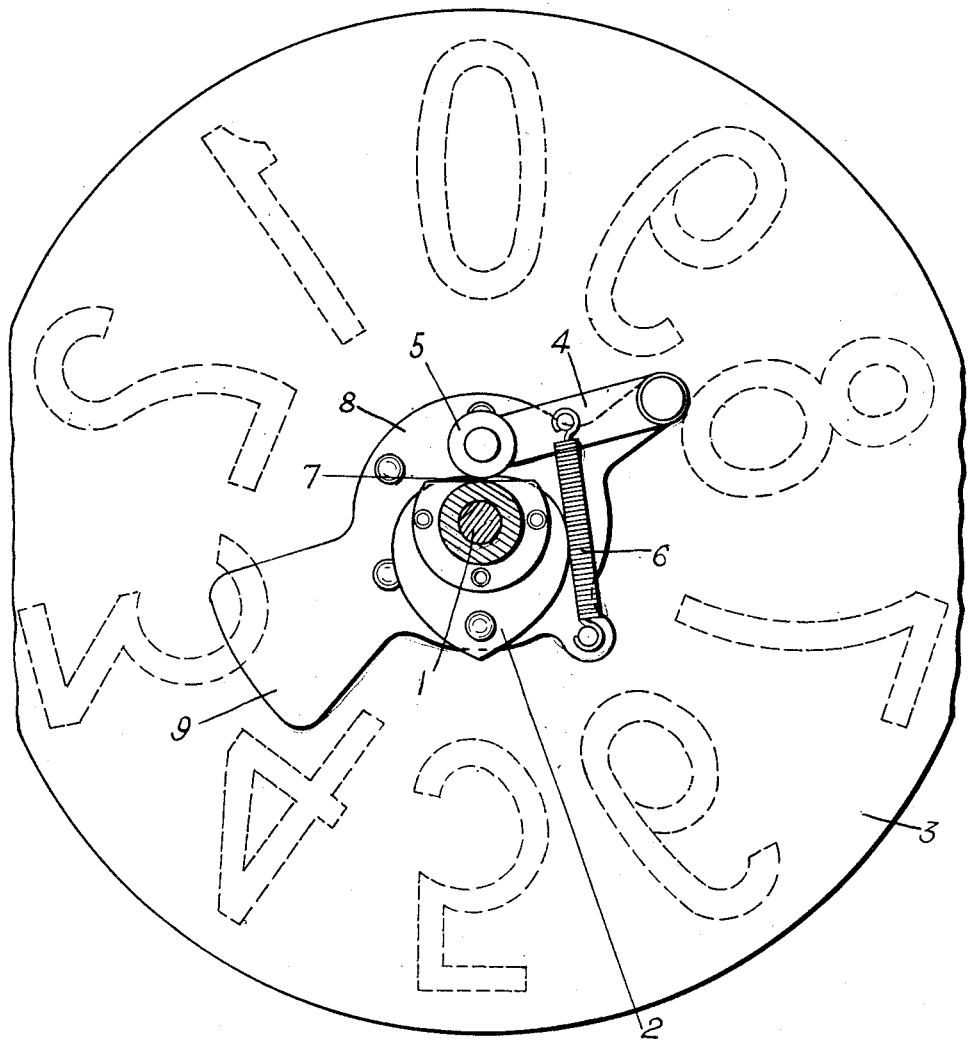

May 13, 1952 J. HANDLEY 2,596,550
CAM ACTUATED ROTARY INDICATOR
Filed April 20, 1948 2 SHEETS—SHEET 1

Inventor:
John Handley
by
Pennie, Edmonds, Morton and Barrows
Attorneys

May 13, 1952     J. HANDLEY     2,596,550
CAM ACTUATED ROTARY INDICATOR
Filed April 20, 1948     2 SHEETS—SHEET 2

Patented May 13, 1952

2,596,550

UNITED STATES PATENT OFFICE 2,596,550

CAM ACTUATED ROTARY INDICATOR

John Handley, Purley, England, assignor to The Union Totalisator Company Limited, Glasgow, Scotland, a company of Great Britain and Northern Ireland Application April 20, 1948, Serial No. 22,119
In Great Britain January 31, 1947

1 Claim. (Cl. 116—129)

This invention relates to display devices for use in totalisators.

The object of the invention is to provide a differential control between the denominational shaft of a totalisator and an indicator disc which indicates the position of that shaft. Such shafts rotate at varying speeds as bets are received, and it is desirable to allow them to rotate at high speeds without compelling the indicator discs to move with them, but to ensure that when the shafts slow down sufficiently or come to rest the indicator discs will assume their correct positions.

According to the present invention in totalisator display devices there is provided a display device carried by a denominational shaft and which includes an indicator disc coaxial with the shaft and rotatable with respect thereto, a heart-shaped cam fixed with respect to and rotatable with the shaft, the root of said cam being nearer to the axis of rotation of the shaft than any other part of the periphery of the cam, an arm pivoted to the indicator disc, and a follower carried on the arm and spring-pressed against the periphery of the cam, whereby the indicator disc tends to take up a position in which the follower is in the root of the cam.

The device of the present invention is applicable, for example, to totalisators of the type disclosed in applicant's Patent No. 2,124,697. The totalisator disclosed in this patent will be provided with a display device according to the present invention by simply removing the indicator disc shown in the drawings of the patent, from the denominational shaft, and replacing it with the indicator disc plus the associated elements disclosed herein.

Figure 2:
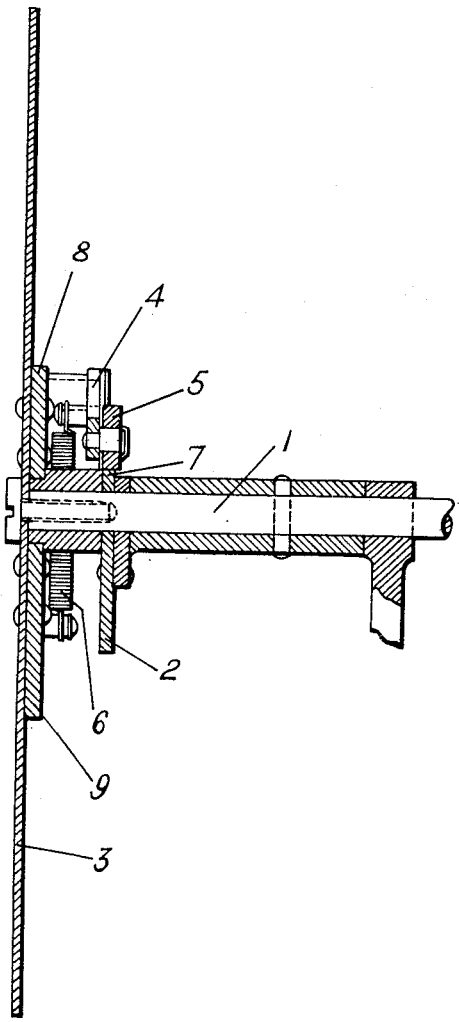

The invention will now be described with reference to the accompanying drawings in which Fig. 1 is an elevation, and Fig. 2 a sectional view at right angles to Fig. 1, showing an indicator disc controlled by a heart-shaped cam on a totalisator aggregator shaft whose angular position is to be indicated.

I denotes a rotary shaft to which is fixed a heart-shaped cam 2. The indicator or display disc 3 is loosely mounted on the shaft I, and pivotally mounted thereon is an arm 4 carrying a follower roller 5 tracking the periphery of the cam 2. The roller 5 is pressed against the cam 2 by a tension spring 6 connected at one end to a pin projecting from a mounting plate 8 fixed to the disc 3 and at the other end to a pin projecting from the arm 4.

The heart-shaped cam 2 is smoothly curved throughout its periphery, and the angle of slope of the cam surface at any point other than the root 7 relative to the tangent at the peak is such that the spring pressure on the roller 5 will cause the roller 5 to move along the cam surface if stationary towards the root 7, so that, if the cam 2 comes to rest with the roller 5 away from the root 7, the roller 5 will move until it is in the root 7 when the indicator disc 3 will correctly record the angular position of the shaft I.

If the shaft I rotates slowly, the follower roller 5 will remain in the root the indicator correctly following the shaft movement. If, however, the shaft I rotates rapidly, the roller 5 will no longer remain in the root but will remain more or less stationary while the cam 2 rotates rapidly beneath it. The angle of slope of the cam surface must not be too steep, or this idler condition will not be possible.

The mounting plate 8 has an extension 9 which forms a balance weight to keep the system in balance and make the operation more reliable.

It will be seen that the shaft I constitutes a first movable member of a mechanism, the indicator disc 3 constitutes the second movable member, while the heart-shaped cam 2, the arm 4, the roller 5 and the spring 6 together constitute interconnecting means whereby the second member is caused to follow up the first member.

The indicating or display disc 3 and its associated parts are preferably balanced to reduce the restoring force required to a minimum.

From the showing in Fig. 1 it will be apparent that the indicator disc 3, carrying the numerals to be displayed and shown in dotted lines in Fig. 1, is free to rotate on the shaft I, except for the resilient mechanism described above. In the operation of the device, when the shaft I is rotated, as for example by an electrical stepping device of known type, the shaft I will rotate without the usual resistance due to the inertia of the disc, since at the commencement of the rotation of the shaft I the disc 3 will move, if at all, only slightly, until the roller 5 commences to move around the enlarged portion of the cam 2, which results in the application of increasing pressure, tending to rotate the disc.

If the shaft I is rotated quickly or rapidly, the cam 2 may move under the roller 5 until it approaches the peak of the cam where maximum rotational pressure will be exerted on the disc 3. Thereafter, when the shaft I comes to rest, the shape of the cam surface in its relation to the axis of the shaft I is such that the roller 5 will move to the root of the cam under the tension of the spring 6, thereby bringing the indicator disc to its normal position with respect to the shaft 1, so that it indicates the rotational or angular position of the shaft, as transmitted, for example, in the manner described above.

In a modified construction the cam 2 may be fixed to the indicator disc 3 instead of to the shaft 1, in which case the arm 4 will be pivoted to a member fixed to the shaft 1.

What is claimed is:

In a totalisator a display device, a shaft and an indicator disc coaxial therewith and rotatable with respect thereto, a heart-shaped cam fixed with respect to and rotatable with said shaft, the root of said cam being nearer to the axis of rotation of said shaft than any other part of the periphery of the cam, an arm pivoted to said indicator disc, and a follower carried on said arm and spring-pressed against the periphery of the cam whereby said indicator disc tends to take up a position in which the follower is in the root of the cam.

JOHN HANDLEY.

REFERENCES CITED

The following references are of record in the file of this patent:

UNITED STATES PATENTS

| Number | Name | Date |
| --- | --- | --- |
| 983,800 | Baker | Feb. 7, 1911 |
| 1,518,634 | Cason, Jr. | Dec. 9, 1924 |
| 2,104,520 | Jackson et al. | Jan. 4, 1938 |
| 2,157,705 | Jones | May 9, 1939 |
| 2,401,501 | Olah | June 4, 1946 |